(12) United States Patent
Lucatello

(10) Patent No.: US 7,252,061 B2
(45) Date of Patent: Aug. 7, 2007

(54) SYSTEM AND METHOD FOR CONTROLLING LOAD AND COMBUSTION IN AN INTERNAL-COMBUSTION ENGINE BY VALVE ACTUATION ACCORDING TO A MULTIPLE LIFT (MULTILIFT) CYCLE

(75) Inventor: Marco Lucatello, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/433,417

(22) Filed: May 15, 2006

(65) Prior Publication Data

US 2006/0266312 A1    Nov. 30, 2006

(30) Foreign Application Priority Data

May 24, 2005    (EP) .................................. 05425364

(51) Int. Cl.
*F01L 1/02* (2006.01)
(52) U.S. Cl. ................ 123/90.31; 123/90.15; 123/90.27; 123/348
(58) Field of Classification Search ............. 123/90.15, 123/90.16, 90.17, 90.18, 90.27, 90.31, 345, 123/346, 347, 348
See application file for complete search history.

(56) References Cited

U.S. PATENT DOCUMENTS

| | | | |
|---|---|---|---|
| 5,526,784 A | 6/1996 | Hakkenberg et al. | |
| 5,746,175 A | 5/1998 | Hu | |
| 5,839,453 A | 11/1998 | Hu | |
| 6,237,551 B1 | 5/2001 | Macor et al. | |
| 6,360,531 B1 | 3/2002 | Wiemero et al. | |
| 6,655,329 B2 * | 12/2003 | Kammerdiener et al. | 123/90.16 |
| 2002/0066428 A1 | 6/2002 | Kammerdiener et al. | |

FOREIGN PATENT DOCUMENTS

| | | |
|---|---|---|
| EP | 0 803 642 A1 | 10/1997 |
| EP | 0 803 642 B1 | 11/2000 |
| EP | 1 273 770 A2 | 1/2003 |
| EP | 1 321 634 A2 | 6/2003 |
| EP | 1 273 770 B1 | 10/2004 |

\* cited by examiner

*Primary Examiner*—Ching Chang
(74) *Attorney, Agent, or Firm*—Nixon & Vanderhye P.C.

(57) ABSTRACT

An internal-combustion engine is equipped with a system of variable actuation of the intake valves that is controlled electronically for the purpose, of imparting on the valves different opening and closing times and different lifts according to the operating conditions of the engine. During one and the same cycle of operation of the engine, the system is able to impart on each intake valve a series of successive cycles of movements of opening and closing within the conventional cycle.

16 Claims, 5 Drawing Sheets

SYSTEM AND METHOD FOR CONTROLLING LOAD AND COMBUSTION IN AN INTERNAL-COMBUSTION ENGINE BY VALVE ACTUATION ACCORDING TO A MULTIPLE LIFT (MULTILIFT) CYCLE

The present invention relates to the field of internal-combustion engines of the type comprising:

at least one cylinder; and at least one intake valve and one exhaust valve associated to the cylinder and actuated so as to control the flow of gases through the respective intake and exhaust pipes, in which at least one valve of the engine is governed by electronic-control variable-actuation means, designed to impart on the valve different opening and closing times., and different lift profiles, as the operating conditions of the engine vary.

BACKGROUND OF THE INVENTION

In recent years there has been an increasing development of studies and experimentation in the field of engines of the type specified above. The present applicant is the holder of numerous patents and patent applications regarding a system for variable actuation of the valves, in which each variable-actuation valve is governed by the respective cam by means of a tappet and corresponding hydraulic means, which include a fluid chamber that is connectable by means of an electronically controlled solenoid valve with an exhaust channel, for the purpose of decoupling the valve itself from the respective tappet and causing rapid closing of the valve as a result of the respective means of elastic return. The solenoid valves that control communication of the fluid chambers associated to the various variable-actuation valves of the engine are controlled electronically according to different possible strategies, as the operating conditions of the engine vary, to achieve advantages in terms of performance and/or efficiency of operation of the engine, and/or reduction of fuel consumption, and/or reduction of harmful exhaust emissions.

Examples of known systems are described and illustrated in the European patents Nos. EP 1 273 770 B1 and EP 1 321 634 B1 filed in the name of the present applicant.

Even though the present invention is particularly aimed at an electro-hydraulic system of the type illustrated in the aforesaid prior documents, it is, however, applicable in general to any type of system of variable actuation of the valves of an engine, i.e., to any system that will enable modification of the times of opening and closing of the valve and the valve lift as the operating conditions of the engine vary. There have, for instance, been proposed in the last few years also systems of an electromechanical type for variable actuation of the valves, in which each valve is governed by a cam of the engine camshaft by means of an electronically controlled variable mechanical transmission, or also electromagnetic or electro-hydraulic valve-actuation systems without cams ("camless" systems). As has been said, the principles of the present invention are applicable also to systems of these kinds or to any other system for variable actuation of the valves, it being able to perform the valve motions described in the present invention.

SUMMARY OF THE INVENTION

The purpose of the present invention is to use the system for variable and flexible actuation of the valves for the purpose of controlling the processes of gas exchange and of combustion of the engine in an optimal way, in given operating conditions.

The underlying inventive idea that enables said purpose to be achieved lies in the fact that the aforesaid electronic-control means are programmed for governing a given valve of the engine, in pre-determined conditions of operation of the engine, in such a way as to impart thereon a plurality of successive cycles of movements of opening and closing, within what would be the single conventional cycle of opening and closing.

The theoretical basis of said invention lies in the fact that the control of the load of an engine through the early closing of the intake valves is very effective in terms of reduction of the work of pumping thanks to the low speed of the piston during the period of opening of the valves and the consequent low fluid-dynamic losses at the valves. Unfortunately, said control mode reduces significantly the efficiency of the thermodynamic cycle and of combustion, as well as the quality of the process of mixing. The alternative mode of control by means of a late opening of the valves, where the speed of the piston is greater, causes an increase of the turbulence in the chamber and facilitates the process of mixing thanks to the high speed of the gases at input and results in an increase in the efficiency of combustion at the expense of an increase in the work of pumping. The two modes described above can be combined in a hybrid mode, which enables late opening and early closing to obtain simultaneously a control of valve crossing and of the load. The combination of the three individual modalities of actuation described above in a single multilift cycle, which forms the subject of the present invention, enables an optimal balancing of the advantages and disadvantages referred to above, enabling control of the amount of the charge with the first phase of the event and the corresponding fluid-dynamic characteristics in its following phases. The possibility of performing said actuations of the valves a number of times during the intake phase and symmetrically or asymmetrically with the valves of the same cylinder provides a wide range of regulations, which can be optimized for each point of operation of the engine according to the specific targets, such as reduction of fuel consumption, abatement of harmful exhaust emissions, cold starting of the engine, stability of combustion, etc.

Furthermore, and in the same context, also considered is the re-opening of the intake and/or exhaust valves during the non-conventional phases (i.e., re-opening of the intake valve or valves during the exhaust phase and re-opening of the exhaust valve or valves in the intake phase) to enable trapping of burnt gases in the chamber (internal exhaust-gas recirculation-EGR) for the purpose of reducing the emissions of nitrogen oxides and/or of increasing the ratio of effective compression of the engine.

Studies and experiments conducted by the present applicant have made it possible to ascertain that by means of said criterion of operation it is possible to achieve considerable advantages for the purposes of obtaining an optimal operation of the engine and in particular for the purpose of influencing specific phenomena, such as pumping, turbulence in the combustion chamber, and in general the motions in the combustion chamber, with direct advantages on the control of efficiency and of the quality of the process of combustion according to the operating conditions and the desired targets.

In the case where each cylinder of the engine is equipped with a number of intake and/or exhaust valves, each valve can be controlled in the way indicated, according to identical or differentiated cycles of operation with respect to the other valve or valves of the same cylinder, thus enabling a wide range of possibilities for controlling the engine to be obtained.

As already mentioned previously, the electro-hydraulic system of variable actuation of the valves that is described in the European patents Nos. EP 0 803 642 B1, EP 1 273 770 B1 and EP 1 321 634 B1, filed in the name of the present applicant, is altogether suited for application of the method that forms the subject of the present invention, consisting in the actuation of the intake and/or exhaust valves of the engine according to a cycle with multiple lifts, during the phases that conventionally pertain thereto (i.e., intake valves during the intake phase and the exhaust valves during the exhaust phase), activating and deactivating the control solenoid valve a number of times during the thrust of the corresponding cam. The actuation of the valves during the phases conventionally not pertaining thereto may be obtained with the aid of a particular shape of the main cam appropriately phased, as described in particular in EP 1 273 770 B1.

The novelty of the present invention lies in the use of the above actuations simultaneously on the same valve not only for control of the amount of air and of burnt gases trapped in the combustion chamber but also of the fluid-dynamic characteristics of the charge in terms of turbulence and convective motions for the purpose of controlling the efficiency of the processes of mixing and combustion.

BRIEF DESCRIPTION OF THE DRAWINGS

The invention will now be described with reference to the annexed drawings, which are provided purely by way of non-limiting example and in which.

DETAILED DESCRIPTION OF THE INVENTION

In the ensuing description, reference will be to an internal-combustion engine with electro-hydraulic variable actuation of the valves according to the known art of the type described, for example, in the European patent No. EP 0 803 642 B1, filed in the name of the present applicant, to which the present invention is applicable. As already indicated, said example is used for facilitating the description of the modes of valve actuation but in no way excludes use of said modes of valve actuation effected with an actuation system of a different type.

Figure 1:
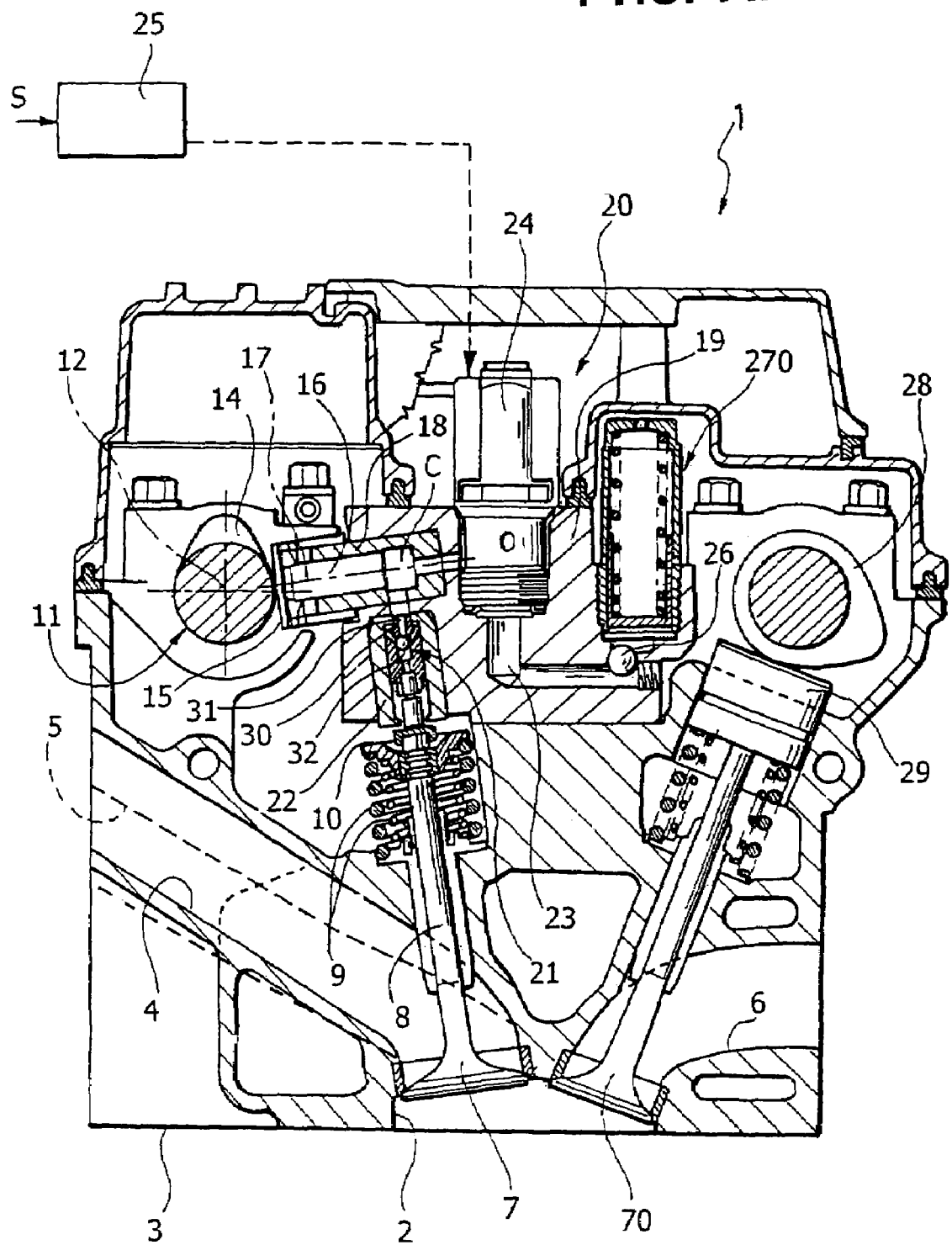
FIG. 1 is a cross-sectional view of an internal-combustion engine according to the known art, of the type described, for example, in the European patent No. EP 0 803 642 B1, filed in the name of the present applicant, which is illustrated herein to provide an example of system of variable actuation of the valves to which the invention is applicable, without this excluding the possibility of the system of valve actuation with which the engine is provided being also of any different type, for example a system of the camless type or of the electromechanical type.

FIG. 1 shows the internal-combustion engine described in the preceding European patent application No. EP-A-0 803 642, filed in the name of the present applicant, which is a multicylinder engine, for example an engine with four cylinders arranged in line, comprising a cylinder head 1. The cylinder head 1 comprises; for each cylinder, a cavity 2 formed in the base surface 3 of the cylinder head 1, defining the combustion chamber, into which two intake pipes 4, 5 and two exhaust pipes 6 give out, said pipes being controlled by two intake valves 7 and two exhaust valves 70. Once again in the case of the example illustrated, the intake valves 7 are governed by the cams 14 of a camshaft 11 via a hydraulic system. The hydraulic system of actuation of each valve includes a hydraulic chamber that is controlled by a normally open solenoid valve 24 governed by a programmable electronic control unit 25. When the solenoid valve 24 is activated (closed), the valve of the engine follows the movement of the cam (full lift). An early closing of the valve may be obtained by deactivating (opening) the solenoid valve 24 so as to empty the hydraulic chamber and to obtain the closing of the valve of the engine under the action of the respective return spring. Likewise, a late opening of the valve may be obtained by delaying activation of the solenoid valve, whereas the combination of a late opening with an early closing of the valve may be obtained with activation and deactivation of the solenoid valve during the thrust of the corresponding cam.

Figure 2:
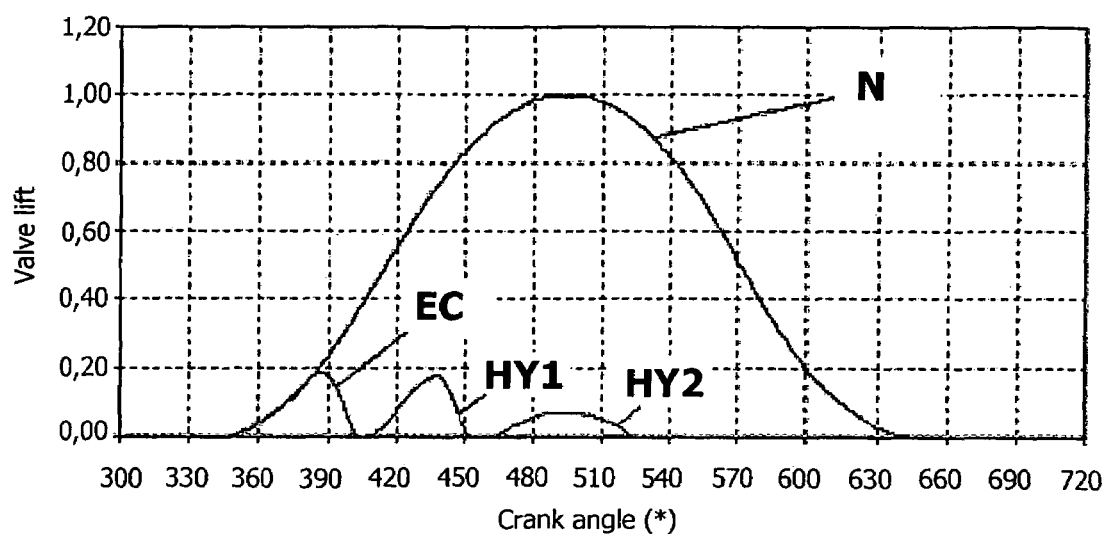
FIGS. 2-8 are diagrams illustrating different methods for controlling the intake valves of an engine with two intake valves for each cylinder, in conformance with the teachings of the present invention.

The diagram of FIG. 2 indicates by N the conventional lift of an intake valve of the engine in the course of rotation of the engine shaft during each cycle of operation of the engine. Said diagram is uniquely given by the geometry of the cam that controls the valve.

The example illustrated in FIG. 2 relates to the case where, of the two intake valves of each cylinder of the engine (designated by the subscripts A and B in the diagrams of FIGS. 2-8), one is governed according to the cycle $N_A$ determined by the respective cam in so far as the respective control solenoid valve is activated continuously, whilst the other is controlled by activating repeatedly the respective control solenoid valve for the purpose of imparting on the intake valve three successive cycles $EC_B$, $HY_B$ and $LO_B$ of opening and closing of the valve, within the single conventional cycle of opening and closing that would be imparted on the valve by the geometry of the cam.

As may be seen, in the case of FIG. 2, the first cycle of opening $EC_B$ coincides initially with the conventional opening cycle determined by the cam. This is obtained in so far as the control solenoid valve initially remains active (i.e., closed). Deactivation of the solenoid valve is obtained in a position corresponding to an engine angle of close on 380°, i.e., a little after TDC of the intake stroke. This causes emptying of the hydraulic chamber and consequently closing of the engine valve as a result of its means of elastic return, said closing being completed, as may be seen, at an angle of close on 410°. The individual cycle "$EC_B$" is thus an early-closing cycle of the valve with respect to the conventional cycle $N_A$ and can guarantee filling of the cylinder with the charge necessary for performing the required work (engine load).

At the end of the first cycle of opening and closing $EC_B$, the same intake valve is, however, again opened and closed, according to a cycle $HY_B$, which is a "hybrid" cycle of late opening and early closing of the valve with respect to the conventional cycle $N_A$. In practice, in a position corresponding to an angle of close on 410° the solenoid valve that controls operation of the intake valve is again closed so as to re-establish hydraulic connection between valve and cam. The intake valve of the engine is hence to be controlled, starting from said angle of the engine, according to a law corresponding to the geometrical profile of the control cam. According to this particular application of the invention, the intake valve is allowed to open, following the profile of the control cam, up to an engine angle of close on 440°, in a position corresponding to which early closing of the valve is caused by re-opening again the control solenoid valve. This brings about early closing of the engine valve, as a result of the corresponding means of elastic return, on account of emptying of the respective hydraulic chamber. Said actuation of the engine valve guarantees the input of a jet of gas at high speed in the cylinder, imparting a particular motion of the charge that is able to increase the turbulence in the chamber and at the same time is able to favour mixing of the charge.

Once closing of the valve has been obtained again, at an angle slightly greater than 450°, the control solenoid valve is kept open, so as to leave the intake valve inactive up to an angle of close on 465°, in a position corresponding to which the solenoid valve is again closed, re-establishing the pressure in the hydraulic chamber and thus again causing lift of the valve with a law corresponding to the one determined by the cam in the arc of angle considered. This means that in said angular range of rotation of the engine shaft, the profile $LO_B$ corresponds to the portion of the profile $N_A$ comprised in the same range. As may be seen, the cycle $LO_B$ is a cycle of late opening of the intake valve of the engine and is preferably used to favour the turbulence and further mixing of the charge.

Of course, the diagram of FIG. 2 is provided purely by way of example. Each intake valve of each cylinder of the engine is obviously controllable in the same way or in a different way with respect to the other intake valve, with or without a multilift cycle, and according to different possible modalities.

Figure 3:
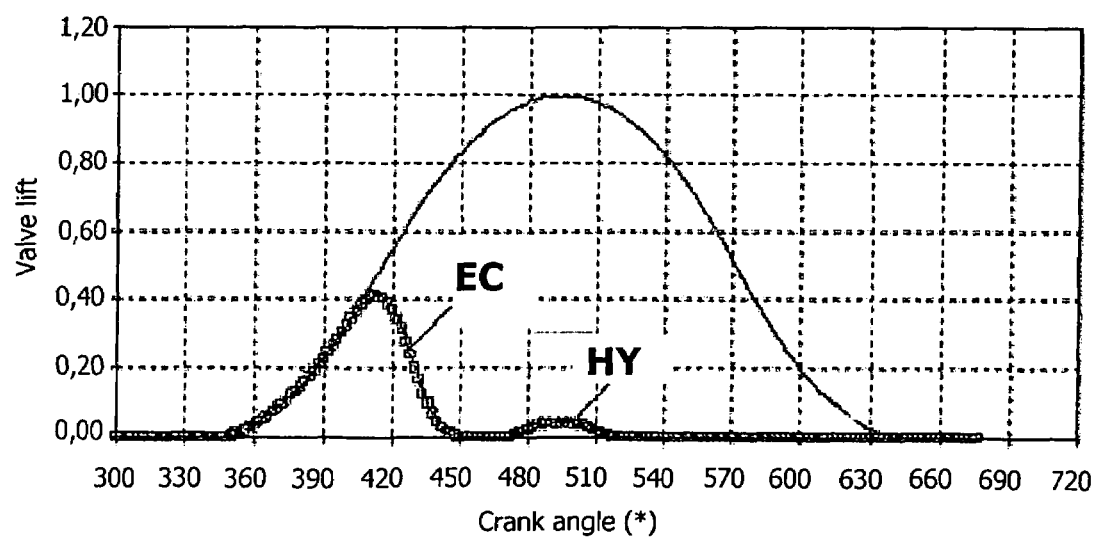

For example, FIG. 3 refers to the case where both of the intake valves of the engine are controlled symmetrically according to a "multilift" cycle comprising a first early-closing cycle EC and just one second late-opening cycle LO.

Figure 4:
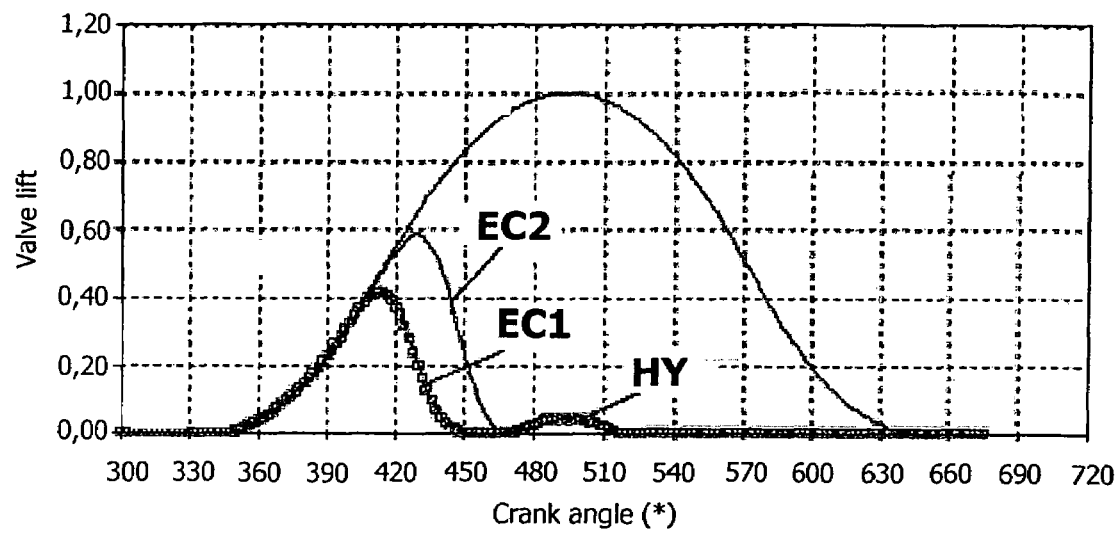

FIG. 4 illustrates the case where both of the intake valves of each cylinder of the engine are controlled initially according to two different cycles of early closing $EC_A$ and $EC_B$, and then both according to one and the same cycle of late opening $LO_A$ (=$LO_B$).

Figure 5:
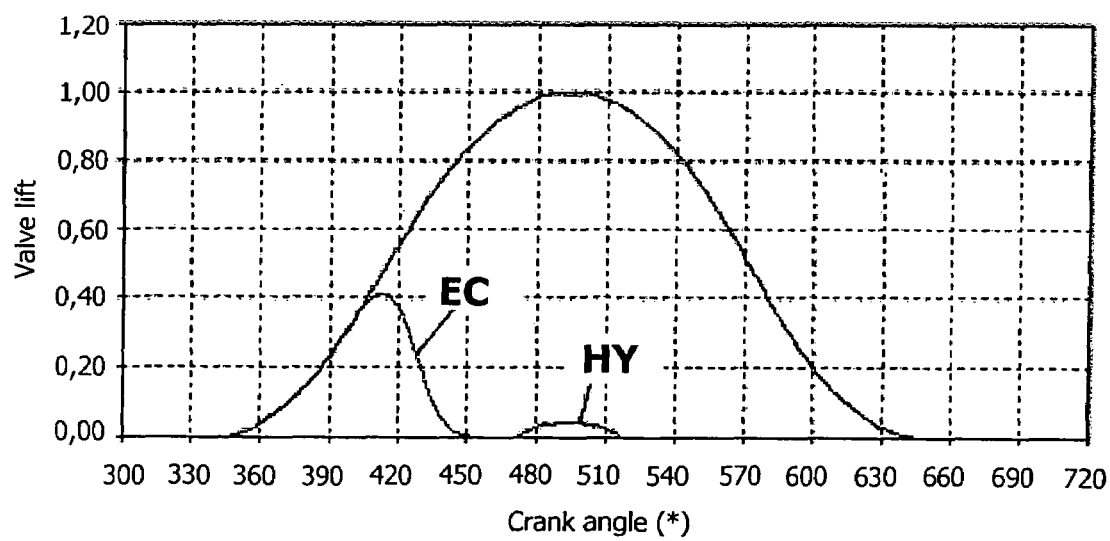

FIG. 5 refers to the case where just one of the two valves is alternately controlled, at each successive cycle of operation of the engine, according to a multilift cycle comprising a first cycle EC and a subsequent cycle LO.

Figure 6:
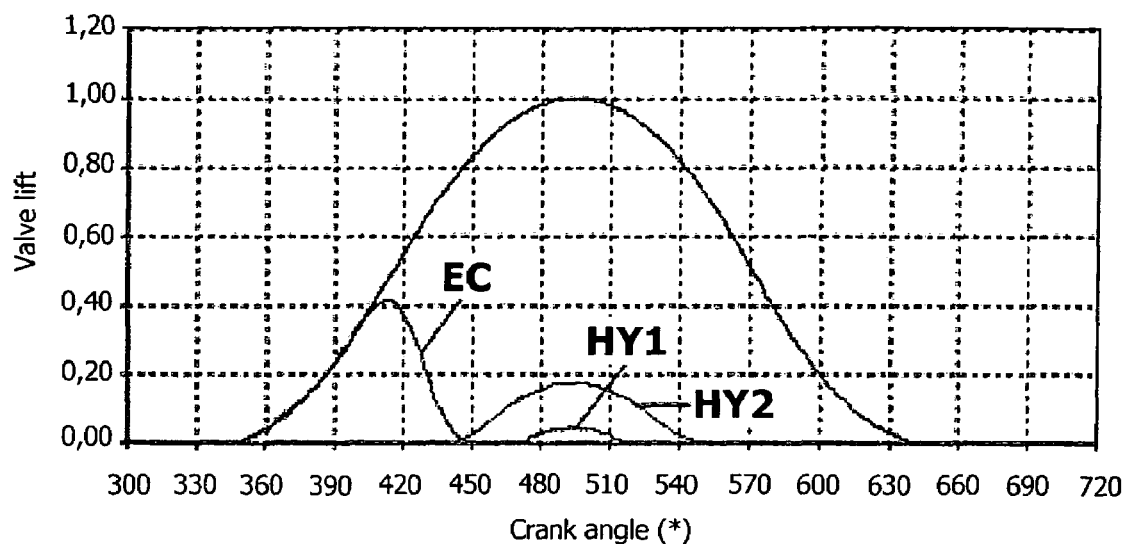

FIG. 6 illustrates the case where one of the two intake valves is governed according to a multilift cycle, with a first subcycle $EC_A$ and a second subcycle $LO_A$, whilst the other intake valve is governed according to a single cycle $LO_B$.

Figure 7:
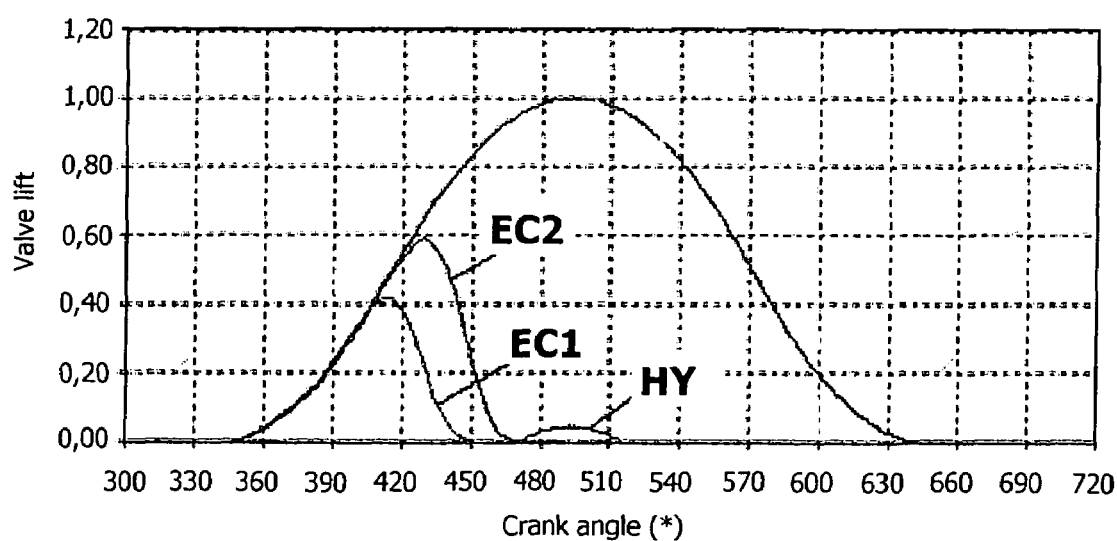

FIG. 7 illustrates a further example for controlling the engine, in which a first intake valve is governed according to a multilift cycle including two successive subcycles $EC_A$ and $LO_A$, whilst the other intake valve is governed according to a single early-closing cycle $EC_B$.

Figure 8:
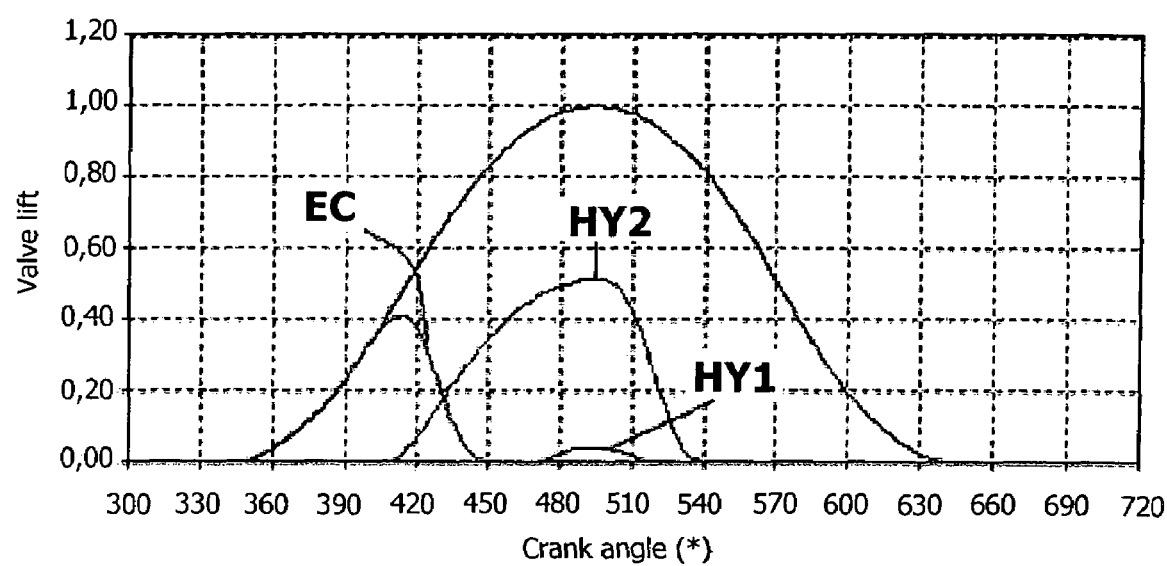

FIG. 8 illustrates a further example in which a first valve is governed according to a multilift cycle $EC_A$-$LO_A$, whilst the other intake valve is governed according to a single hybrid cycle $HY_B$.

Of course, at the moment in which a valve is governed according to a multilift cycle, said cycle can present any number of successive subcycles of movements of opening and closing of the valve if supported by the specific actuation system. Furthermore, said subcycles can be all of a hybrid type, or else the first of them can be of the type with opening corresponding to the geometry of the cam and early closing, or else again the last of them can be of the type with "late opening" and closing corresponding to the geometry of the cam, or else again the multilift cycle can have the first of its subcycles of the type with traditional opening and early closing and the last subcycle of the type with late opening and traditional closing. The latter mode of actuation is very efficient in terms of ratio between expenditure of energy and positive effects on combustion.

In a multivalve engine, the mode of operation according to the invention can be adopted symmetrically by the individual cylinder on all of the intake valves, which consequently open all following the same law of valve lift or else asymmetrically, where each intake valve of a cylinder is actuated according to a specific law. Actuations of a symmetrical type and of an asymmetrical type bestow on the air trapped in the cylinder different characteristics of motion, leading to the desired modulation of the range of turbulence and of the process of mixing according to the point of operation of the engine. It is to be noted that, in the case where the aim is to actuate both of the valves once again symmetrically, and with reference to the type of actuator described in FIG. 1, it is possible to consider the adoption of an actuation system comprising just one cam 14, a pumping element 16, and a tappet 21, which acts on both of the valves of the same cylinder through a mechanical link or, alternatively, just one cam 14 and one pumping element 16 communicating hydraulically with two tappets 21 acting simultaneously on the two valves.

In general, each valve can be actuated according to the multilift mode forming the subject of the present invention or else according to a single cycle of late opening, or else according to a single of cycle early closing, or else again according to a single hybrid cycle. Consequently, in general the valve can be actuated according to four different modes (late opening, early closing, hybrid cycle, multilift cycle). In the case of two valves with asymmetrical control, the possibility of choosing four different modalities of actuation for each valve leads to 18 different modes of management that can be implemented, which is extremely useful for finding, in each operating condition of the engine, the ideal cycle of valve actuation to obtain advantageous effects from the standpoint of pumping, gas exchange, modulation of turbulence in the combustion chamber, and in general of the convective motions for mixing the fuel with the supporter of combustion in the combustion chamber.

To the cases described above there should also be added the possibility of opening of the intake and/or exhaust valves during the exhaust and/or intake phases, respectively, to enable trapping of burnt gases in the chamber. It is obvious that such a mode of controlling the valves is particularly favoured by the idea of multiple actuations during the intake phase, since the control of the level of turbulence in the chamber is indispensable for controlling the stability of the combustion in the presence of high percentages of inert gases in the chamber.

Obviously, in the case of cylinder heads with three or more intake valves for each cylinder, the possible combinations increase.

As already described above, the invention aims in particular at protecting the application of the aforesaid ideas of multiple actuation of the valves to a variable-actuation system of the electro-hydraulic type that has already formed the subject of the preceding patents filed in the name of the present applicant. However, the same concepts are applicable to any internal-combustion engine equipped with any system for variable and flexible actuation of the valves that will enable the type of valve actuation described to be performed.

The subsequent series of cycles of movements of opening and closing of the valve can also comprise one or more cycles that do not lead to a total closing of the valve. In other words, theoretically it is not possible to rule out that, for example with reference to FIG. 2, the second "subcycle" (HY1) crosses with the first subcycle EC so that the valve starts re-opening again before it has completely closed.

Of course, the criterion whereby each intake valve of the engine is controlled as the operating conditions of the engine vary can be pre-determined according to the specific requirements. For instance, it is possible to envisage that an intake valve of the engine will be actuated according to a single early-closing cycle EC when the engine is idling, and that the time of opening of the valve will be progressively increased as the r.p.m. and engine load increase, then to pass to the conventional cycle N in extreme conditions of demand on the engine for higher performance. In other specific operating conditions, instead, the same valve of the engine is actuated according to a single late-opening cycle, or else according to a single hybrid cycle, or else according to the multilift mode forming the subject of the present invention, for the purpose of specific requirements, linked both to the type of engine (for example, controlled-ignition or diesel engines) and to the specific environmental parameters and parameters of operation of interest.

Of course, without prejudice to the principle of the invention, the details of construction and the embodiments may vary widely with respect to what is described and illustrated herein purely by way of example, without thereby departing from the scope of the present invention.

Theoretically, the engine according to the invention can be without a throttle valve in the intake pipe, since the function of the throttle valve can be performed by the intake valves of the engine, thanks to the electronic-control system for variable actuation of the valves which, as already mentioned, is able to regulate the amount of the charge introduced and, consequently, the engine load.

What is claimed is:

1. A system for controlling load and combustion in an internal-combustion engine, comprising:
   at least one cylinder and at least one intake valve and an exhaust valve for controlling the flow of gases through the respective intake and exhaust pipes,
   in which at least one valve is governed by electronically controlled variable-actuation means designed to impart on the valve different opening and closing times, and different lifts, as the operating conditions of the engine vary,
   said control system being characterized in that said electronically controlled variable-actuation means are controlled by electronic-control means programmed for governing a given valve, in pre-determined conditions of operation of the engine, in such a way as to impart thereon a plurality of successive cycles of movements of opening and completely closing the intake valve within what would be a single conventional cycle of opening and closing the intake valve.

2. The engine according to claim 1, wherein said successive cycles of movements of opening and closing of the valve comprise at least one initial cycle, in which the valve opens according to a conventional mode and closes in advance.

3. The engine according to claim 1, wherein said successive cycles of movements of opening and closing of the valve comprise at least one last cycle, in which opening of the valve is delayed with respect to a conventional cycle, and in which the said valve closes according to the conventional cycle.

4. The engine according to claim 1, wherein a series of successive cycles of movements of opening and closing of the valve comprises at least one hybrid cycle of late opening and early closing of the valve.

5. The engine according to claim 4, wherein said hybrid cycle is the first of said series of successive cycles.

6. The engine according to claim 1, wherein it comprises a plurality of intake valves associated to the cylinder, characterized in that said electronic-control means are programmed for imparting said successive cycles of movements of opening and closing of the valve on just one of the valves.

7. The engine according to claim 1, wherein it comprises a number of intake valves associated to the cylinder and in that the electronic-control means are programmed for imparting the aforesaid successive cycles of movements of opening and closing on two or more valves for each cylinder, in an identical way for the different valves of one and the same cylinder, or else in a differentiated way, or else in an alternating way, reversing the cycles imparted on the different valves of one and the same cylinder at each successive cycle of operation of the engine.

8. A method for controlling an internal-combustion engine of the type comprising at least one cylinder and at least one intake valve and an exhaust valve associated to the cylinder for controlling respective intake and exhaust pipes, and in which at least one valve is governed by electronically controlled variable-actuation means designed to impart on the valve different opening and closing times, and different lifts, as the operating conditions of the engine vary,
   said method being characterized in that the aforesaid variable-actuation means are controlled so that, in pre-determined conditions of operation of the engine, there is imparted on a given valve a series of successive cycles of movements of opening and completely closing the intake valve within what would be a single conventional theoretical cycle of opening and closing of the intake valve.

9. The method according to claim 8, wherein a series of successive cycles of movements of opening and closing of the valve comprises at least one first cycle in which the valve opens according to a conventional mode and closes in advance.

10. The method according to claim 8, wherein said series of successive cycles of movements of opening and closing of the valve comprise at least one last cycle in which opening of the valve is delayed with respect to a conventional cycle.

11. The method according to claim 8, wherein said series of successive cycles of movements of opening and closing of the valve comprises at least one hybrid cycle (HY) in which opening of the valve is delayed and the valve closes in advance with respect to a conventional cycle.

12. The method according to claim 11, wherein said hybrid cycle is the first of said series of successive cycles.

13. The method according to claim 8, applied to an engine that comprises a number of intake valves for each cylinder, wherein each intake valve is controlled as the operating conditions of the engine vary, both according to an aforesaid multilift mode at successive cycles of opening and closing, and, in different conditions of operation of the engine, according to at least one from among different modes, comprising: a mode that envisages a single early-closing cycle, a mode that envisages a single cycle of late opening and a mode that envisages a single hybrid cycle of late opening and early closing.

14. The method according to claim 13, wherein the valves of one and the same cylinder are controlled in an identical way with respect to one another.

15. The method according to claim 13, wherein the valves of each cylinder are controlled in a differentiated way with respect to one another.

16. The method according to claim 15, wherein the valves of each cylinder are controlled in an alternating way, reversing the respective modes of operation at each successive cycle of operation of the engine.

* * * * *